United States Patent [19]

Iida et al.

[11] Patent Number: 4,742,944

[45] Date of Patent: May 10, 1988

[54] VEHICLE BODY WITH ROOF CARRIER HAVING SPACED PROJECTIONS FOR REDUCING WIND NOISE

[75] Inventors: Nozomi Iida, Fujisawa; Shigeyuki Hagino, Zama, both of Japan

[73] Assignee: Nissan Motor Co., Ltd., Yokohama, Japan

[21] Appl. No.: 754,983

[22] Filed: Jul. 15, 1985

[30] Foreign Application Priority Data

Jul. 16, 1984 [JP]  Japan .......................... 59-107203[U]

[51] Int. Cl.[4] ............................................. B62D 25/00
[52] U.S. Cl. ............................... 224/316; 343/DIG. 1
[58] Field of Search ................. 224/42.07, 309, 316, 224/317, 325, 326, 331; 174/86, 138 A; 343/DIG. 1

[56] References Cited

U.S. PATENT DOCUMENTS

| Re. 26,538 | 3/1969 | Bott | 224/316 |
|---|---|---|---|
| 2,098,388 | 11/1937 | Hruska | 174/86 X |
| 2,481,823 | 9/1949 | Cejka | 174/138 A X |
| 2,753,095 | 7/1956 | Barassi et al. | 224/325 X |
| 3,056,570 | 10/1962 | Slavin | 224/317 X |
| 3,178,139 | 4/1965 | McFarlin | 224/317 X |
| 3,325,067 | 6/1967 | Helm | 224/325 X |
| 3,519,178 | 7/1970 | Helm et al. | 224/316 |

FOREIGN PATENT DOCUMENTS

| 1092494 | 4/1955 | France | 224/325 |
|---|---|---|---|
| 2125773 | 3/1984 | United Kingdom | 224/316 |

*Primary Examiner*—Eugene R. LaRoche
*Assistant Examiner*—Benny T. Lee
*Attorney, Agent, or Firm*—Foley & Lardner, Schwartz, Jeffery, Schwaab, Mack, Blumenthal & Evans

[57] ABSTRACT

A rod-like protrusion of a vehicle body such as an antenna is provided with a projection at an outer peripheral portion intermediate the opposite ends thereof.

4 Claims, 2 Drawing Sheets

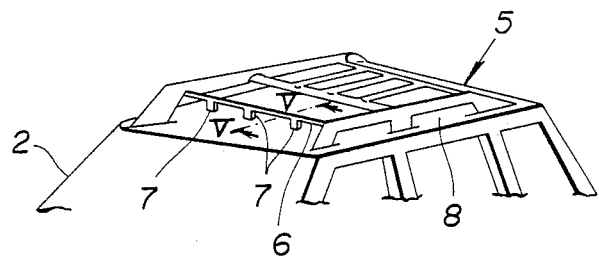
FIG. 4
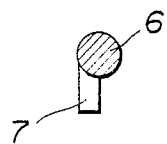
FIG. 5
FIG. 6
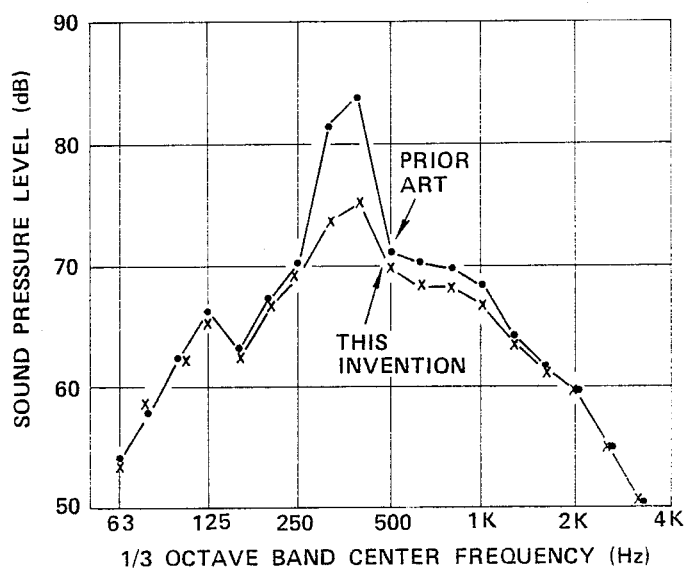

4,742,944

VEHICLE BODY WITH ROOF CARRIER HAVING SPACED PROJECTIONS FOR REDUCING WIND NOISE

BACKGROUND OF THE INVENTION

1. Field of the Invention

The present invention relates in general to vehicle bodies having rod-like protrusions on the exterior surface thereof and more particularly to improvements in such rod-like protrusions which reduce wind noise when the vehicle is travelling at a high speed.

2. Description of the Prior Art

A vehicle body has on the exterior surface thereof various rod-like protrusions such as an antenna, roof carrier, outside mirrors, etc. Such protrusions are one of the causes for automotive wind noise. For example, wind noise due to an antenna results from resonance occurring when a Karman vortex sheet is shed in the wake of the antenna and its vortex shedding frequency is equal or near to the natural vibration frequency of the antenna. In this connection, it is known that the vortex shedding frequency is directly proportional to the velocity of air flowing past the antenna and inversely proportional to the diameter of the antenna. Accordingly, during the running of a vehicle having a rod-like protrusion, a vortex of a Karman vortex sheet extending continuously lengthwise of the rod-like protrusion and in the wake of same is created depending upon the running speed of the vehicle, which causes wind noise of an intensity proportional to the vortex shedding frequency.

SUMMARY OF THE INVENTION

In accordance with the present invention, a rod-like protrusion of a vehicle body is provided with a projection at an outer peripheral portion intermediate opposite ends thereof. Such projection is operative to separate a vortex of a Karman vortex sheet created in the wake of the rod-like protrusion and extending longitudinally of the protrusion, into parts and to keep the parts separate from each other. This separation is effective in reducing wind noise as will be described hereinafter.

It is accordingly an object of the present invention to provide a novel and improved vehicle body which can reduce wind noise.

It is another object of the present invention to provide a novel and improved vehicle body of the above mentioned character which is quite useful though simple in structure.

BRIEF DESCRIPTION OF THE DRAWINGS

The features and advantages of the vehicle body according to the present invention will be more clearly appreciated from the following description taken in conjunction with the accompanying drawings, in which:

FIG. 4 is a fragmentary perspective view of a vehicle body according to another embodiment of the present invention, the vehicle body having on the exterior surface thereof a rod-like protrusion constituted by a transverse member of a roof carrier;

FIG. 5 is a sectional view taken along the line V—V of FIG. 4; and

FIG. 6 is a graph showing a sound pressure level-frequency characteristic effected by the vehicle body of FIG. 4 in comparison with a corresponding characteristic effected by the comparable prior art vehicle body.

DETAILED DESCRIPTION OF THE PREFERRED EMBODIMENTS

Figure 1:
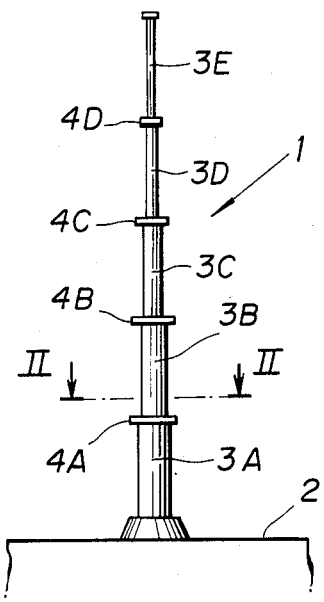
FIG. 1 is a fragmentary elevational view of a vehicle body according to an embodiment of the present invention, the vehicle body having on the exterior surface thereof a rod-like protrusion constituted by an antenna.
Figure 2:
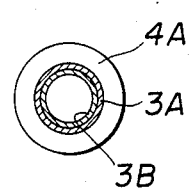
FIG. 2 is a sectional view taken along the line II—II of FIG. 1.
Figure 3:
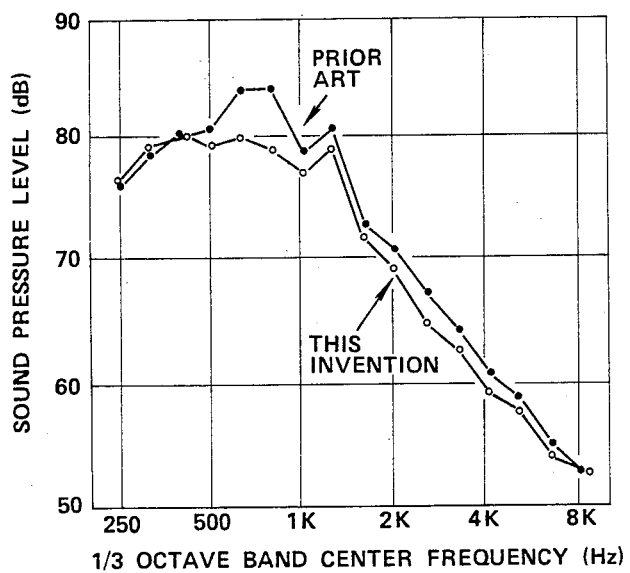
FIG. 3 is a graph showing a sound pressure level-frequency characteristic effected by the vehicle body of FIG. 1 in comparison with a corresponding characteristic effected by the comparable prior art vehicle body.

Referring first to FIGS. 1 through 3, generally indicated by the reference numeral 1 is a radio antenna disposed on the exterior surface of a vehicle body 2. The radio antenna 1 is of the telescopic rod type and is shown in FIG. 1 in a completely extended state, the antenna comprising a plurality of rod sections 3A-3E which are joined in such a manner that the section located nearer to the free end of the antenna 1 is slidable into the adjacent section located nearer to the fixed end of the antenna.

In accordance with the present invention, the rod sections 3A-3D have, at the respective ends nearer to the free end of the antenna 1, annular outward flanges 4A-4D. In other words, the radio antenna 1 has at the junctions of the rod sections 3A-3E annular outward projections 4A-4D each of which is secured to a rod section located nearer to the fixed end of the antenna 1.

Projections 4A-4D operate, upon high-speed running of a vehicle, to separate a vortex of a Karman vortex sheet, created in the wake of the antenna 1 and extending longitudinally or lengthwise of same, into parts and such that the parts remain apart from each other. This is quite effective for reducing wind noise as is apparent from the test results shown in FIG. 3. FIG. 3 is a graph showing variations of sound pressure level as a function of one-third octave band center frequency, and from this graph it will be understood that the vehicle body of the present invention causes a reduced sound pressure level as compared with the comparable prior art vehicle body. Wind noise is therefore reduced by an amount corresponding to the reduction of sound pressure level. In the foregoing, it is to be noted that, since the projections 4A-4D are arranged at the ends of the rod sections 3A-3D nearer to the free end of the antenna 1, they do not interfere with extension and contraction of the antenna 1.

Referring next to FIGS. 4 through 6, generally indicated by the reference numeral 5 is a roof carrier having a transverse rod-like member 6 adjacent the forward end of a roof 8 of the the vehicle body 2. The transverse member 6 has on the exterior surface thereof a plurality of projections 7 projecting downwardly toward the roof 8.

Such projections 7 operate to separate a vortex of a Karman vortex sheet which is created in the wake of the transverse member 6 and extends the transverse member longitudinally, into parts such that the parts remain apart from each other. Accordingly, as is apparent from the test results shown in FIG. 6, the vehicle body according to this embodiment causes a reduced sound pressure level as compared with the comparable prior art vehicle body. This embodiment therefore can produce substantially the same effect as the previous embodiment. Furthermore, the projections 7 can serve as hooks for use in securing luggages on the roof carrier 5.

While a radio antenna and a transverse member of a roof carrier have been herein described and shown as examples of rod-like projections on the exterior surface of a vehicle body, the present invention may be applied to other rod-like projections such as, for example, a stay projecting from the vehicle for supporting an outside mirror.

What is claimed is:

1. A roof carrier for a vehicle, comprising:
a rod-like member positionable transversely to the direction of movement of the vehicle, the rod-like member having means for reducing wind noise comprising:
a plurality of spaced apart projections downwardly extending from the rod-like member, each projection having a transversely extending width and a downwardly extending length, the number of said projections and the width and length of each projection, being sufficient to separate the vortex formed by a Karman vortex sheet which extends from the rod-like member in a direction substantially opposite to the direction of movement of the vehicle, the width of each projection being substantially less than the axial length of the rod-like member.

2. A roof carrier as claimed in claim 1, wherein the means for reducing wind noise comprises three projections spaced apart from one another along the axial length of the rod like member.

3. A roof carrier as claimed in claim 1, wherein each projection extends downwardly substantially perpendicular to the direction of movement of the vehicle.

4. A roof carrier as claimed in claim 1, wherein said rod-like member comprises a forward-most transverse member on the roof carrier, relative to normal vehicle travelling direction.

* * * * *